(12) United States Patent
Bachar et al.

(10) Patent No.: US 9,897,432 B2
(45) Date of Patent: Feb. 20, 2018

(54) INDUCTANCE-BASED POSITION SENSING IN A DIGITAL CAMERA ACTUATOR

(71) Applicant: Corephotonics Ltd., Tel-Aviv (IL)

(72) Inventors: Gil Bachar, Tel-Aviv (IL); Ephraim Goldenberg, Ashdod (IL); Gal Shabtay, Tel-Aviv (IL)

(73) Assignee: Corephotonics Ltd, Tel Aviv (IL)

( * ) Notice: Subject to any disclaimer, the term of this patent is extended or adjusted under 35 U.S.C. 154(b) by 9 days.

(21) Appl. No.: 15/028,426

(22) PCT Filed: Jul. 19, 2014

(86) PCT No.: PCT/IB2014/063245
§ 371 (c)(1),
(2) Date: Apr. 10, 2016

(87) PCT Pub. No.: WO2015/068061
PCT Pub. Date: May 14, 2015

(65) Prior Publication Data
US 2016/0258736 A1   Sep. 8, 2016

Related U.S. Application Data

(60) Provisional application No. 61/900,442, filed on Nov. 6, 2013, provisional application No. 61/923,695, filed
(Continued)

(51) Int. Cl.
*H04N 5/232* (2006.01)
*G03B 13/00* (2006.01)
(Continued)

(52) U.S. Cl.
CPC ........... *G01B 7/003* (2013.01); *G01D 5/2013* (2013.01); *H04N 5/2254* (2013.01); *H04N 5/23287* (2013.01); *G03B 2205/0053* (2013.01)

(58) Field of Classification Search
CPC .............. G03B 7/10; G03B 2205/0053; G03B 2205/0069; G03B 2205/0084;
(Continued)

(56) References Cited

U.S. PATENT DOCUMENTS

| 6,069,418 A | 5/2000 | Tanaka |
| 8,180,211 B2 | 5/2012 | Gerhards |

(Continued)

FOREIGN PATENT DOCUMENTS

| WO | 2013076350 A1 | 5/2013 |
| WO | 2015068056 A1 | 5/2015 |

OTHER PUBLICATIONS

Chien Sheng Liu et al "A miniaturized low-power VCM actuator for auto-focusing applications", Optics Express, 16 (4), p. 2533-2541, (2008).

(Continued)

*Primary Examiner* — Kelly L Jerabek
(74) *Attorney, Agent, or Firm* — Nathan & Associates Patent Agents Ltd; Menachem Nathan (57) ABSTRACT

Inductance-based sensing in a digital camera in which actuation of at least one electromagnetic (EM) actuator that includes at least one stationary ferromagnetic member associated with a large air gap causes a moving ferromagnetic member mechanically coupled to an optical element to by-pass or bridge the large air gap through at least one smaller air gap. The stationary member includes at least one ferromagnetic core surrounded at least partially by a coil. An inductance value correlated with a position of the optical element may be measured using the same coil as the one used for the actuation. In some embodiments, a single EM actuator includes two coils and the actuator is driven using both coils, while a regular or a mutual inductance is measured. In some camera embodiments that include two oppo-
(Continued)

site EM actuators, one actuator is used to move the optical element while the other actuator is used to measure the inductance value.

13 Claims, 9 Drawing Sheets

Related U.S. Application Data on Jan. 5, 2014, provisional application No. 61/984,749, filed on Apr. 26, 2014.

(51) Int. Cl.
*G01B 7/00* (2006.01)
*H04N 5/225* (2006.01)
*G01D 5/20* (2006.01)

(58) Field of Classification Search
CPC ...... G03B 2205/00; G02B 7/04; G11B 7/093; G11B 7/0908; G11B 7/0925; G11B 7/0927; H02K 41/0356
See application file for complete search history.

(56) References Cited

U.S. PATENT DOCUMENTS

| | | | |
|---|---|---|---|
| 8,320,756 B2 * | 11/2012 | Jacobsen | G03B 3/10 348/340 |
| 2006/0033818 A1 | 2/2006 | Wada et al. | |
| 2007/0217775 A1 * | 9/2007 | Shirono | G02B 7/102 396/72 |
| 2008/0192363 A1 * | 8/2008 | Shirono | G02B 7/08 359/698 |
| 2009/0295986 A1 * | 12/2009 | Topliss | F03G 7/065 348/374 |
| 2010/0001718 A1 | 1/2010 | Howard et al. | |
| 2011/0176052 A1 | 7/2011 | Knogden et al. | |
| 2013/0215511 A1 | 8/2013 | Wu et al. | |

OTHER PUBLICATIONS

International Search Report and Written Opinion issued in related PCT patent application PCT/IB2014/063245, dated Jul. 7, 2015, 10 pages.

* cited by examiner

INDUCTANCE-BASED POSITION SENSING IN A DIGITAL CAMERA ACTUATOR

CROSS REFERENCE TO RELATED APPLICATIONS

This application is a 371 application from international application PCT/IB2014/063245 and related to and claims priority from U.S. Provisional Patent Application (PPA) No. 61/923,695 filed Jan. 5, 2014, U.S. PPA No. 61/984,749 filed Apr. 26, 2014 and titled "Inductance-based position sensing in a digital camera actuator", and U.S. PPA No. 61/900,442 filed Nov. 6, 2013 and titled "Electromagnetic actuators for digital cameras", all of which applications are incorporated herein by reference in their entirety.

FIELD

Embodiments disclosed herein relate in general to electromagnetic (EM) actuators used in miniature digital cameras, and more particularly to apparatus and methods for sensing (or measuring) the position of a moving member of such actuators.

BACKGROUND

Actuators for miniature cameras (exemplarily as in smart phones) are used to shift and/or tilt optical elements in the camera to achieve focus, image stabilization or shutter movement. There are several methods to achieve the force needed for actuation. EM actuators use ferromagnetic materials, discussed herein, to provide a magnetic actuation force. Actuator structures are disclosed for example in co-invented and co-assigned PCT patent application PCT/IB2014/062836 filed Jul. 3, 2014 and titled "Electromagnetic actuators for digital cameras", include at least one stationary ferromagnetic member and at least one moving ferromagnetic member, the stationary and moving members having operating surfaces, the operating surfaces facing each other across a small air gap. Each actuator structure has at least one large air gap in the magnetic circuit that includes all the stationary ferromagnetic members, which do not move during the actuation. Each large air gap is either by-passed or bridged through smaller air gaps by the moving ferromagnetic member. Such actuator structures are designed to pull the moving ferromagnetic member and reduce the magnetic reluctance of the actuator and thereby provide a large magnetic force. In most embodiments the reluctance changes significantly with movement in a first ("force/actuation") direction, while in the other two ("indifferent") directions, in-plane and orthogonal to the first direction, the reluctance is hardly changed or not changed at all with movement. As described in detail in PCT/IB2014/062836, the magnetic circuit always acts toward closing the large air gap, thus pulling the moving ferromagnetic member in one direction, e.g. +X. Pulling in the opposite direction (e.g. −X) can be achieved using one of two methods: forced-back-actuation ("method 1"), which uses a spring to retract the optical element to zero position, or dual-actuation ("method 2"), which uses an opposite actuator to create an opposite force.

A great improvement in control would be achieved if one knew the exact position of the moving member relative to the stationary member during the actuation process. For example, "A miniaturized low-power VCM actuator for auto-focusing applications", Optics Express, 16 (4), p. 2533, 2008 describes how an actuator with a known relative position of a stationary member vs. a moving permanent magnet, reduces the power consumption during actuation. In another example, US patent application 2013/0215511A1 describes position sensing (measurement) performed in conjunction with actuators to improve the accuracy of an optical image stabilization (OIS) system. Position sensing in these two cases is done using an additional sensing circuit, such as a Hall bar, which measures a magnetic field in space.

Position sensing based on a change in the inductance of a coil is known. Various schemes using inductance-based position sensing have been applied to cameras. However, in known designs, special coils are added to the camera just for the purpose of position sensing. This adds at least one component to the apparatus and complicates the design and operation. For example, U.S. Pat. No. 8,180,211 B2 describes a method for position and motion sensing in a miniature camera, using a magnetic circuit that includes a ferromagnetic part and a coil, while motion is done using a permanent magnet and a coil.

There is therefore a need for and it would be advantageous to have position measurement in a digital camera that does not require use of additional sensing circuits, such as additional coils, permanent magnets or Hall bar sensors.

SUMMARY

In some embodiments there is provided a method for sensing the position of an optical element in a digital camera comprising the steps of: providing a first electro-magnetic (EM) actuator that includes a first stationary ferromagnetic member having a first ferromagnetic core surrounded at least partially by a first coil, the first stationary member being part of a first magnetic circuit that includes a first large air gap; actuating the first EM actuator to move the optical element in a first direction, wherein the actuation causes a moving ferromagnetic member coupled mechanically to the optical element to by-pass or bridge the first large air gap through at least one air gap smaller than the first large air gap; measuring an inductance value; and correlating the measured inductance related value with a position of the optical element.

In an embodiment, the step of actuating includes supplying a strong low frequency signal to the first coil and the step of measuring an inductance value includes measuring an inductance using a response to a weak high frequency signal or using a response to a current pulse supplied to the first coil.

In an embodiment, the first ferromagnetic core is further surrounded at least partially by a second coil and the step of measuring an inductance value includes measuring an inductance using a response to a weak high frequency signal or using a response to a current pulse supplied to both coils.

In an embodiment, the first actuator further includes a second ferromagnetic core surrounded at least partially by a second coil, the second ferromagnetic member being part of the first magnetic circuit that includes the first large air gap, and the step of measuring an inductance value includes measuring an inductance using a response to a weak high frequency signal or using a response to a current pulse supplied to both coils.

In an embodiment, the first ferromagnetic core is further surrounded at least partially by a second coil, the inductance value is a mutual inductance value, the step of actuating includes supplying a respective strong low frequency signal to each coil, and the step of measuring an inductance value includes supplying a weak high frequency signal or a current pulse to one coil and measuring a response in the other coil, the response correlated with the mutual inductance value.

In an embodiment, the first actuator further includes a second ferromagnetic core surrounded at least partially by a second coil, the inductance value is a mutual inductance value, the step of actuating includes supplying a respective strong low frequency signal to each coil, and the step of measuring an inductance value includes supplying a weak high frequency signal or a current pulse to one coil and measuring a response in the other coil, the response correlated with the mutual inductance value.

In an embodiment, a method further comprises the steps of providing a second EM actuator having a second stationary ferromagnetic member with a respective second ferromagnetic core surrounded at least partially by a second coil, the second stationary member being part of a second magnetic circuit that includes a second large air gap, the second EM actuator being configured to move the optical element in a second direction opposite to the first direction. Only one actuator is actuated at one time. Exemplarily, only the first actuator is actuated, the second EM actuator is not actuated, and the step of measuring an inductance value includes measuring the inductance value using the second actuator.

In some embodiments there is provided apparatus for sensing the position of an optical element in a digital camera comprising: a first EM actuator that includes a first stationary ferromagnetic member with a first ferromagnetic core surrounded at least partially by a first coil, the first stationary member being part of a first magnetic circuit that includes a first large air gap, the first EM actuator configured to move the optical element in a first direction when actuated, the actuation causing a first moving ferromagnetic member mechanically coupled to the optical element to by-pass or bridge the first large air gap through at least one smaller air gap; and an inductance-based position sensing module configured to drive the actuation and to measure an inductance value correlated with a given position of the optical element.

In an embodiment, the inductance-based position sensing module includes a driving circuit with a current driver operative to provide a low frequency high current signal and either a high frequency low current signal or a pulse current signal, and an inductance-based position sensing circuit operative to measure the inductance value. In an embodiment, the first ferromagnetic core is further surrounded at least partially by a second coil and the driving circuit and the inductance-based position sensing circuit are coupled electrically to both coils. In an embodiment with two coils, the inductance value is a mutual inductance value, the driving circuit is configured to provide the low frequency high current signal to both coils and to provide either the high frequency low current signal or the pulse current signal to one coil, and the inductance-based position sensing circuit is configured to measure the mutual inductance value based on a response to the high frequency low current signal or the pulse current signal obtained in the other coil.

In an embodiment, the first actuator further includes a second elongated ferromagnetic core surrounded at least partially by a second coil, the second ferromagnetic member being part of the first magnetic circuit that includes the first large air gap, and the driving circuit and the inductance-based position sensing circuit are coupled electrically to both coils. In an embodiment of an actuator with two cores and two coils, the driving circuit is configured to provide the low frequency high current signal and the high frequency low current signal or the pulse current signal to both coils. In an embodiment with two cores and two coils, the inductance value is a mutual inductance value, the driving circuit is configured to provide the low frequency high current signal to both coils and to provide either the high frequency low current signal or the pulse current signal to one coil, and the inductance-based position sensing circuit is configured to measure the mutual inductance value based on a response to the high frequency low current signal or to the pulse current signal obtained in the other coil.

In an embodiment, an apparatus further comprises a second EM actuator having a second stationary ferromagnetic member with a ferromagnetic core surrounded at least partially by a second coil, the second stationary member being part of a second magnetic circuit that includes a second large air gap, the second EM actuator being configured to move the optical element in a second direction opposite to the first direction.

BRIEF DESCRIPTION OF THE DRAWINGS

Non-limiting embodiments are herein described, by way of example only, with reference to the accompanying drawings, wherein.

DETAILED DESCRIPTION

Figure 1:
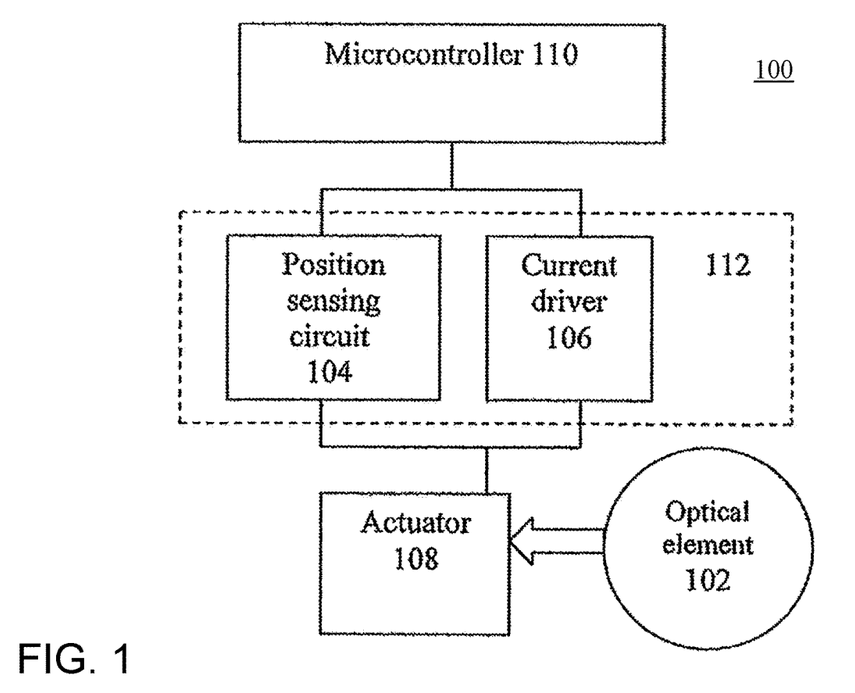
FIG. 1 shows schematically in a block diagram an embodiment of a camera subsystem for actuating an optical element in a digital camera and for sensing its position, as disclosed herein.

FIG. 1 shows schematically in a block diagram an embodiment numbered 100 of an apparatus (or "subsystem") for actuating an optical element 102 in a digital camera and for sensing its position, as disclosed herein, for the case where actuation is done with method 1 (forced-back-actuation). The actuated optical element may exemplarily be a lens, a camera module (lens and sensor), a camera sensor or a camera shutter. Subsystem 100 includes an inductance-based position sensing circuit 104 and a current driver 106, both electrically connected to a coil (not shown) of an actuator 108. The actuator types may be for example as disclosed in PCT patent application PCT/IB2014/062836, where retracting springs are shown for example in FIG. 12. As disclosed therein, each such actuator has at least one large air gap in a magnetic circuit that includes all stationary ferromagnetic members (which do not move during the actuation). During actuation, each large air gap is either by-passed or bridged through smaller air gaps by a moving ferromagnetic member. The actuator structure is designed to pull the moving ferromagnetic member and to reduce the magnetic reluctance of the actuator and thereby provide a large magnetic force. In an embodiment, the inductance-based position sensing circuit and the current driver may be combined into an inductance-based sensing module 112. Subsystem 100 further includes a microcontroller 110 (which may be implemented in full or in part in a microcontroller of the camera) for controlling the actuation of the actuator, the position sensing circuit and associated current driver.

In use, position sensing during actuation (which causes movement of a moving ferromagnetic member and an optical element attached thereto) is obtained by measuring an inductance change of an actuator coil and by correlating the inductance change with a position of the moving ferromagnetic member/optical element. The inductance measurement may be performed using any known method. Exemplary methods are described in more detail below. In some embodiments, the same coil is used for actuation and for position sensing. Two actuation/sensing method embodiments may be used: in a first embodiment, a strong (for example 10-100 mA) DC or low frequency AC "driving" signal (for example up to the mechanical resonance frequency with typical value of 100 Hz) is used for actuation. Hereinafter, both DC and low frequency AC driving signals will be referred to as "low frequency" driving signals. The position measurement is obtained by measuring inductance in the actuation coil using a weak (for example 1-10 mA) high frequency AC signal (for example 10 times or more of the mechanical resonance frequency with typical value of 100 Hz) (see inductance measurement methods 2a, 2b, 3 and 4 below). In a second embodiment, a pulse signal on top of the driving signal is sent to the coil (see measurement method 1). Provided the pulse is much shorter (e.g. ≤1 msec) than a retracting spring resonance period (e.g. 10 msec), the time multiplexing of signals does not interfere with the actuator motion.

Figure 2A:
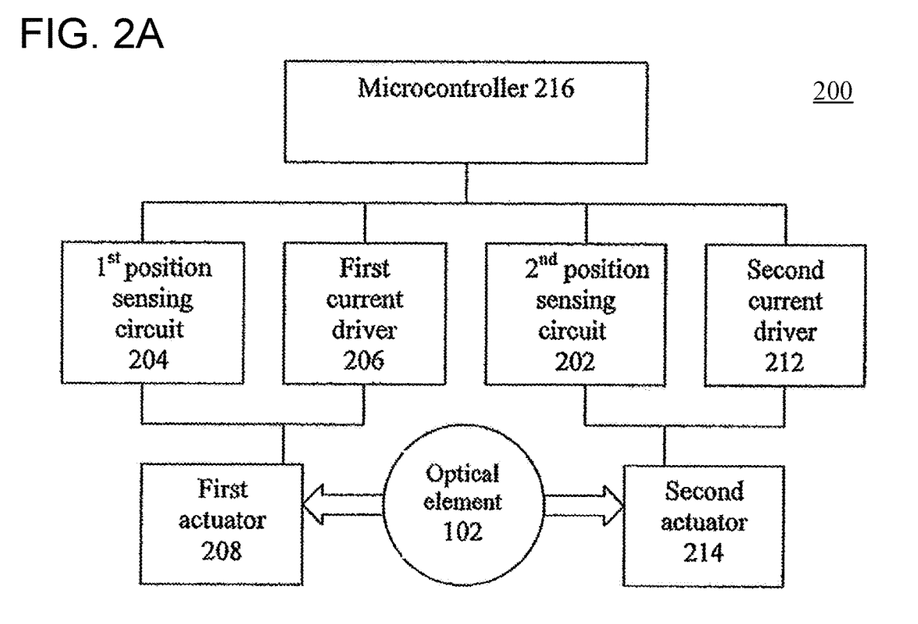
FIG. 2A shows schematically in a block diagram yet another embodiment of a camera subsystem for actuating an optical element in a digital camera and for sensing its position, as disclosed herein.

FIG. 2A shows schematically in a block diagram another embodiment numbered 200 of a subsystem for actuating an optical element 202 in a digital camera and for sensing its position, as disclosed herein. The actuation in subsystem 200 is dual-actuation (involving two actuators). Subsystem 200 includes a first position sensing circuit 204 and a first current driver 206, both electrically connected to a coil (not shown) of a first actuator 208, and a second position sensing circuit 210 and a second current driver 212, both electrically connected to a coil (not shown) of a second actuator 214. As in subsystem 100, the inductance-based position sensing circuit and the current driver may be combined into an inductance-based sensing module (not shown). The optical element is mechanically coupled to the moving ferromagnetic member. The two actuators form an actuator pair. Each actuator pair includes two identical actuators of the type disclosed for example in PCT patent application PCT/IB2014/062836. In an exemplary embodiment, the actuators may be of the type shown in FIGS. 3 and 4 herein and in FIGS. 10 and 13 of PCT/IB2014/062836. Subsystem 200 further includes a microcontroller (or simply "controller") 216 for controlling the actuation of the two actuators and the position sensing circuits and associated current drivers. The controller may be implemented in full or in part in a microcontroller of the camera.

Figure 2B:
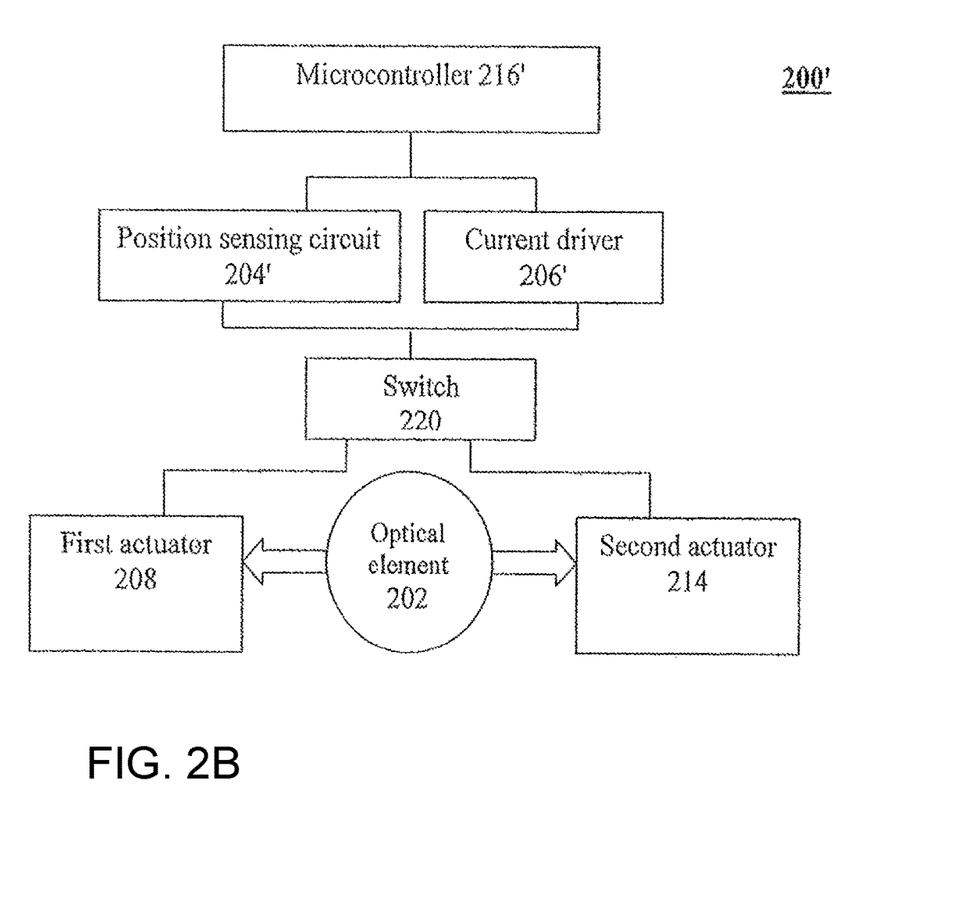
FIG. 2B shows schematically in a block diagram yet another embodiment of a camera subsystem for actuating an optical element in a digital camera and for sensing its position, as disclosed herein.

In another embodiment 200', shown in FIG. 2B, the two position sensing circuits may be combined into a single position sensing circuit 204', and the two current drivers may be combined into a single current driver 206', with the controller switching the connection of the position sensing circuit and current driver between the two actuators through a switch 220. As in subsystem 100, the inductance-based position sensing circuit and the current driver may be combined into an inductance-based sensing module (not shown).

Figure 3:
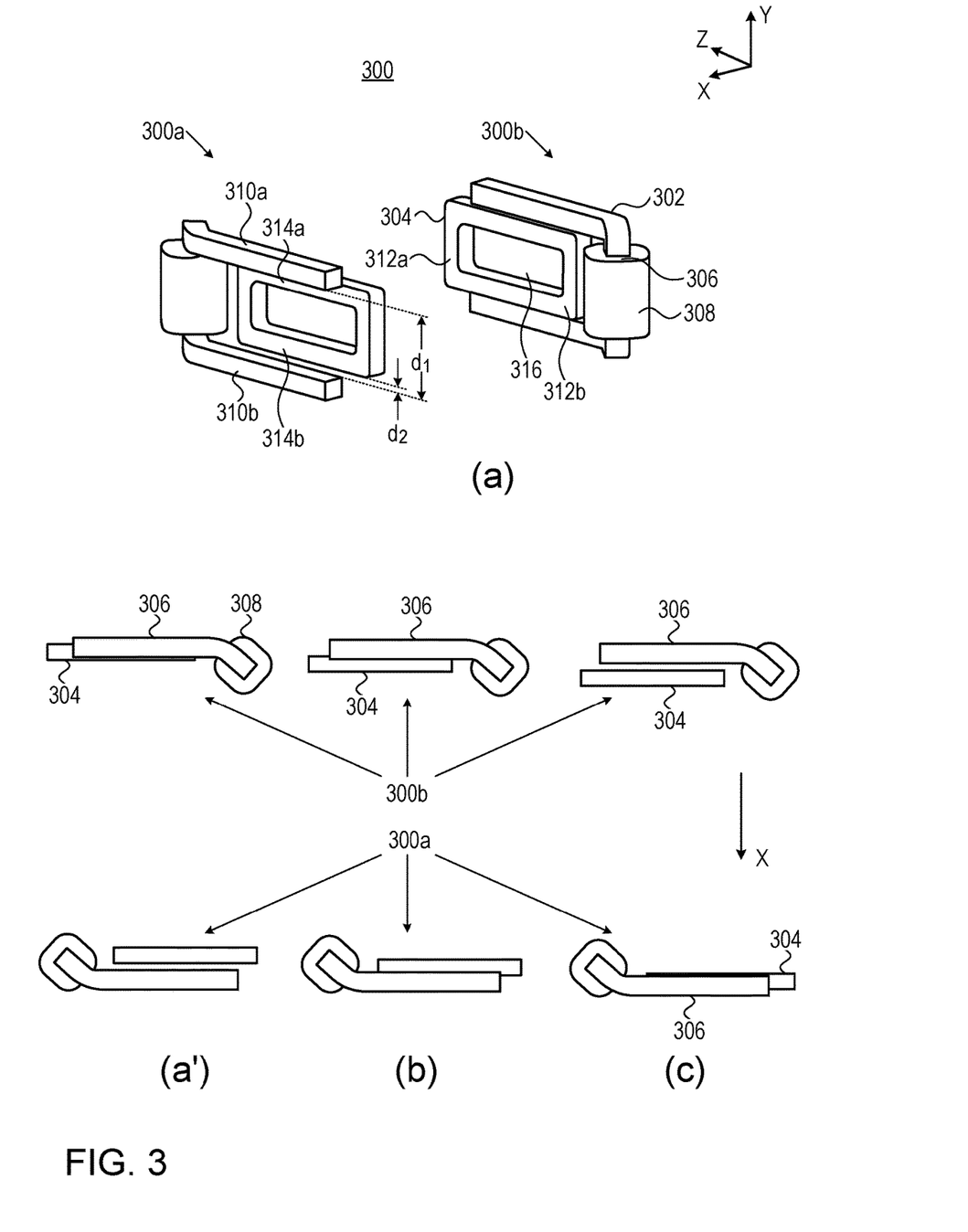
FIG. 3 shows an arrangement of two actuators used to move and sense a lateral motion of an optical element as disclosed herein: (a) isometric view and (a') top view of the actuator pair in a first position, (b) and (c) top views only in respectively second and third positions.

FIG. 3 shows an arrangement 300 of a pair of identical actuators numbered 300a and 300b, used to sense a lateral position of an optical element such as a lens, a camera module, a camera sensor or a camera shutter. The X-Y-Z coordinate frame shown holds for all actuator drawings discussed below (i.e. for FIGS. 3 and 4). Actuators 300a and 300b are similar to an actuator 1000 in PCT patent application PCT/IB2014/062836. The actuators are not necessarily drawn to scale, and different parts therein may be scaled differently than shown. FIG. 3(a) shows an isometric view while FIG. 3(a') shows a top view of the actuator pair in a first position. Second and third positions are shown in top views only in FIGS. 3(b) and 3(c).

Since the two actuators are identical, some parts are may be numbered in actuator 300a while other parts may be numbered in actuator 300b. Each actuator comprises a first ferromagnetic frame 302 and a second ferromagnetic frame 304. Exemplarily, frame 302 may be stationary (fixed) and frame 304 may be moving. Fixed frame 302 includes an elongated ferromagnetic core 306 surrounded at least partially by a coil 308, and two arms 310a and 310b. Arms 310a and 310b face each other across a large air gap $d_1$. Moving frame 306 has a hollow rectangular (ring) shape, with two base members 312a and 312b and two arms 314a and 314b. The ring has an internal opening 316 that may, in some embodiments, be scaled such that it accommodates the optical element inside it. In other embodiments, the optical element may be connected to a planar side of the ring. In this case the ring may be closed. Arms 314a and 314b are nested inside frame 302 in the X-Z plane. Pairs of arms 314a and 310a and 314b and 310b are substantially parallel and separated along a length dimension by a small air gap $d_2$.

Each arm has an operative surface bordering the small air gap. More details may be found in PCT patent application PCT/IB2014/062836.

In operation, current passing through coil 308 induces a magnetic field through the magnetic circuit. Large gap $d_1$ is bridged by moving frame 304 and through the small air gaps. The action by the coil induced magnetic force on moving frame 304 is a "pull" action. The symmetry of the structures ensures that side forces (in the X-Z plane) are inherently cancelled out.

In FIG. 3, the actuators are arranged as an "opposite" pair and the actuation is dual-actuation ("method 2"). The "opposite" label indicates that a "pull" action of one actuator pulls the optical element in an opposite direction to that of the other. One actuator (exemplarily actuator 300a) drives the pull force to pull the optical element in one direction (as shown, +X) using a strong (for example 1-10 mA) low frequency signal (for example up to the mechanical resonance frequency with typical value of 100 Hz). Position measurement is obtained by measuring inductance in the coil of the opposite actuator (in this case in actuator 300b), which is referred to as "sensing coil". That is, actuation is performed using one coil while inductance is measured using the other coil. An opposite movement of the lens is achieved by using actuator 300b to pull the optical element in the opposite direction (−X). In this case, the inductance is measured using the coil of actuator 300a as sensing coil. Note that the moving ferromagnetic members move in sync, being mechanically coupled to each other as well as to the optical element. The three positions shown are successive positions in the +X direction: in (a, a') the moving members are at the first position, in (b) they have moved along the +X axis to the second position and in (c) they have moved even further along the +X axis to the third position.

Figure 4:
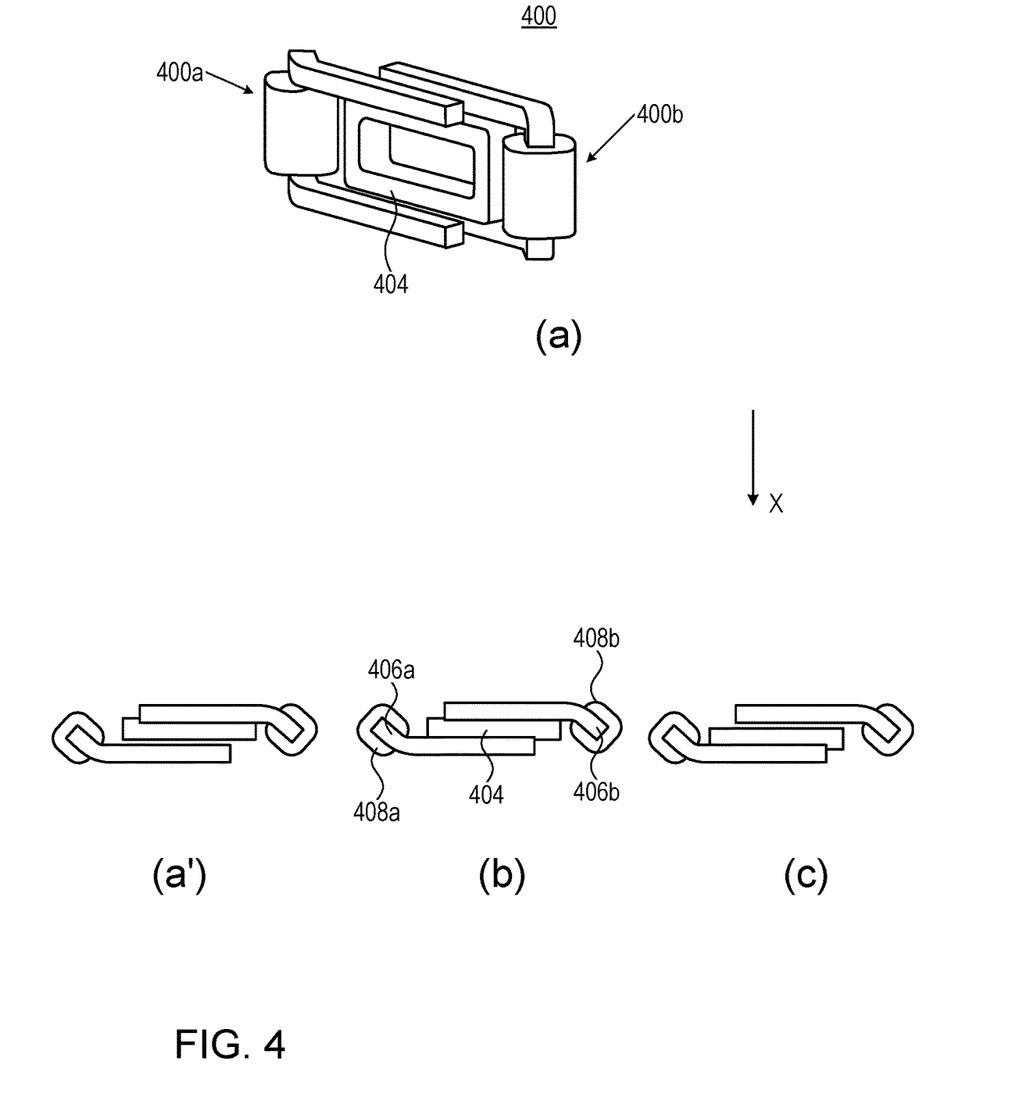
FIG. 4 shows another arrangement of two actuators used to move and sense a lateral motion of an optical element as disclosed herein: (a) isometric view and (a') top view of the actuator pair in a first position, (b) and (c) top views only in respectively second and third positions.

FIG. 4 shows another arrangement 400 of a pair of actuators numbered 400a and 400b used to sense a lateral motion of an optical element. FIG. 4(a) shows an isometric view while FIG. 4(a') shows a top view of the actuator pair in a first position. Second and third positions are shown in top views only in FIGS. 4(b) and 4(c). In contrast with the arrangement in FIG. 3, here the two actuators share a single moving ferromagnetic member 404. Opposite actuators 400a and 400b have respective cores 406a and 406b surrounded at least partially by coils 408a and 408b. In operation, one actuator pulls the moving member 404 while inductance is measured in the coil of the opposite actuator, using the same moving member for causing a change in the inductance. As in FIG. 3, the three positions of moving ferromagnetic member 404 are increasing +X positions. Moving member 404 is mechanically coupled to an optical element, so its movement translates directly into a movement of the optical element.

Inductance Measurement Methods

1. Current Charging Time

There are several known methods for measuring inductance in magnetic reluctance actuators. One such method measures current charging time in a sensing coil. Assume that a coil of an actuator as in FIG. 3 or 4 has typical values of inductance L=2 mH and resistance, R=20Ω. Exemplarily, the sensing coil may be charged using a voltage source that is part of a sensing circuit such as 104 or 110 with an external voltage $V_{in}$ to obtain a first order response:

$$V_{in} = RI_L + L\dot{I}_L$$

where $I_L$ is the current in the sensing coil and $\dot{I}_L$ is the derivative of the current with respect to time. For an input $V_{in}=V_0 u(t)$, where u(t) is a Heaviside (unit) step function and $V_0$ is the step height in voltage, and with zero initial conditions $I_L(0)=0$, the solution for t>0 is $$I_L = \left[1 - \exp\left(-\frac{t}{\tau}\right)\right] V_0$$

The rise time of the circuit is measured by measuring the current. The rise time is proportional to the $$induntance \tau = \frac{L}{R}.$$

Figure 5:
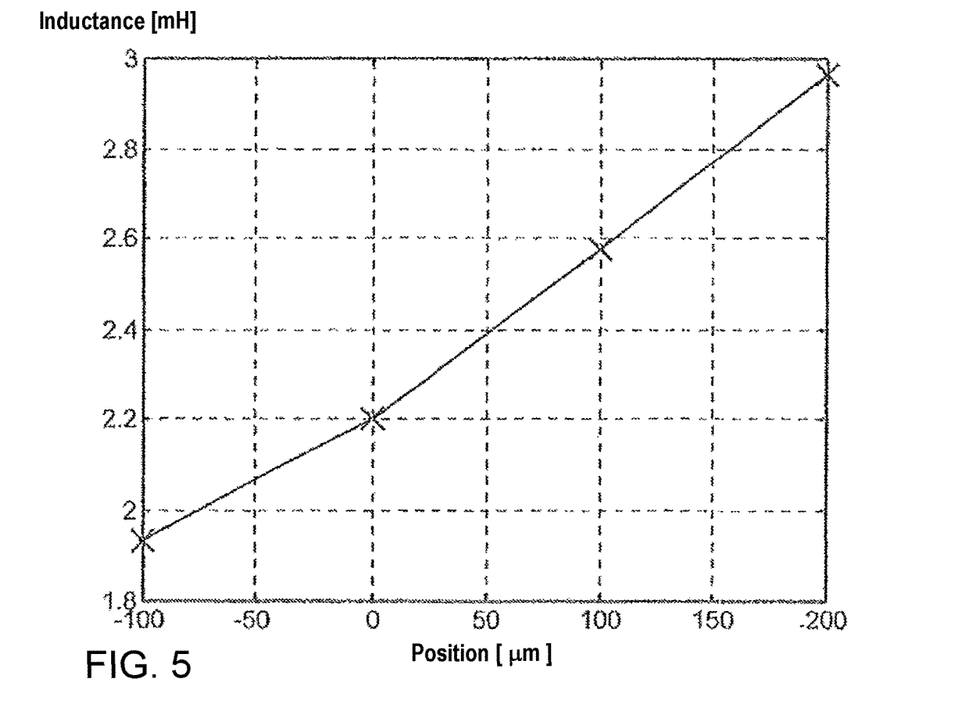
FIG. 5 shows simulation results for inductance vs. position, obtained using finite element method (FEM) software.

Once the inductance is known, it may be translated into position using inductance-position graphs such as the graph shown in FIG. 5. FIG. 5 shows simulation results for inductance vs. position (X), obtained using finite element method (FEM) software. The line is interpolated between the simulated points.

2a. Maxwell Bridge with an Inductor

Figure 6A:
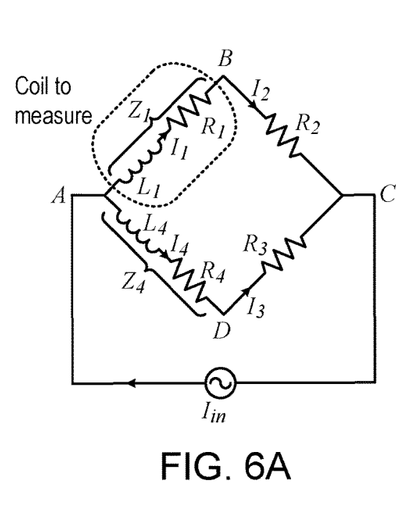
FIG. 6A shows a Maxwell bridge with an inductor sensing circuit used in a method disclosed herein.

Another method uses the circuit shown in FIG. 6A. AC current is inserted, and the voltage drop is measured as $V_{out}=V_{BD}$. A current divider provides $$I_1 = \frac{Z_4 + R_3}{Z_1 + R_2 + Z_4 + R_3} I_{in}$$

$$I_4 = \frac{Z_1 + R_2}{Z_1 + R_2 + Z_4 + R_3} I_{in}$$

where "Z" stands for impedance $Z = R + j\omega L$. The Kirchhoff voltage law (KVL) provides:

$$V_{out} = I_1 R_2 - I_4 R_3 = \left(\frac{Z_4 + R_3}{Z_1 + R_2 + Z_4 + R_3} R_2 - \frac{Z_1 + R_2}{Z_1 + R_2 + Z_4 + R_3} R_3\right) I_{in} =$$

$$= \frac{Z_4 R_2 - Z_1 R_3}{Z_1 + R_2 + Z_4 + R_3} I_{in}$$

For $R = R_1 = R_2 = R_3 = R_4$, $L_4 = L_1 + \Delta L$, $R \gg \omega L$, $L > \Delta L$ $$V_{out} = \frac{j\omega \Delta L}{j\omega 2 L_1 + j\omega \Delta L + 4R} R I_{in} \approx \frac{1}{4} j\omega \Delta L I_{in}$$

hence the voltage read in the circuit is linearly proportional to the inductance.

2b. Maxwell Bridge with a Capacitor

Figure 6B:
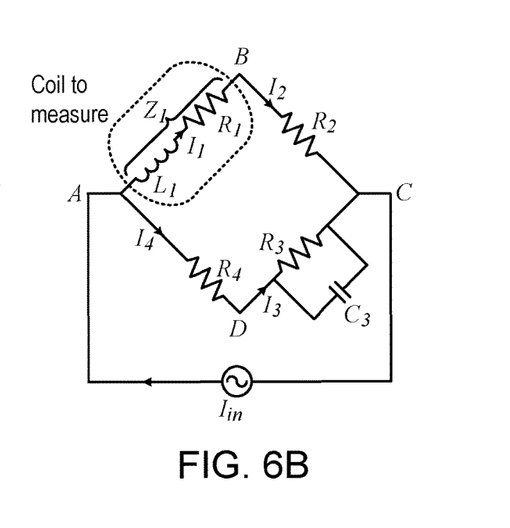
FIG. 6B shows a Maxwell bridge with a capacitor sensing circuit used in a method disclosed herein.

Yet another method uses the circuit shown in FIG. 6B. AC current is inserted, and the voltage drop is measured as $V_{out}=V_{DB}$. Define:

$$Z_1 = R_1 + j\omega L_1, \quad Z_3 = \left(\frac{1}{R_3} + j\omega C_3\right)^{-1}$$

A current divider provides:

$$I_1 = \frac{Z_3 + R_4}{Z_1 + R_2 + Z_3 + R_4} I_{in}$$

$$I_4 = \frac{Z_1 + R_2}{Z_1 + R_2 + Z_3 + R_4} I_{in}$$

KVL provides:

$$V_{out} = I_1 Z_1 - I_4 R_4 = \left(\frac{Z_3 + R_4}{Z_1 + R_2 + Z_3 + R_4} Z_1 - \frac{Z_1 + R_2}{Z_1 + R_2 + Z_3 + R_4} R_4\right) I_{in} = \frac{Z_1 Z_3 - R_2 R_4}{Z_1 + R_2 + Z_3 + R_4} I_{in}$$

For $R_1 = R_2 = R_3 = R_4 = R$:

$$V_{out} = \frac{(R + j\omega L_1)\left(\frac{1}{R} + j\omega C_3\right)^{-1} - R^2}{3R + j\omega L_1 + \left(\frac{1}{R} + j\omega C_3\right)^{-1}} I_{in} = \frac{j\omega L_1 - j\omega C_3 R^2}{4 + \frac{j\omega L_1}{R} + 3j\omega C_3 R - \omega^2 L_1 C_3} I_{in}$$

Now assume $L_1 = L + \Delta L$ and $L \gg \Delta L$, where $L = C_3 R^2$:

$$V_{out} \approx \frac{j\omega \Delta L}{4 + 4\frac{j\omega L}{R} - \frac{\omega^2 L^2}{R^2}} I_{in} \approx \frac{1}{4} j\omega \Delta L I_{in}$$

and again, the voltage in the output is linearly proportional to the inductance. Typical values: for L=2 mH, R=20Ω, the capacitance needed is $$C = \frac{L}{R^2} = 5\mu F.$$

For $$\omega = 1500 \frac{rad}{s}, \omega L = 3\Omega, \text{ and } \frac{1}{\omega C} = 133\Omega.$$

3. Measurement of Coil Impedance

Yet another method for measuring the impedance $Z = R + \omega L$ of the sensing coil directly. For given sinusoidal current driving, one can measure the phase and amplitude of the output voltage. The driving frequency should be typically larger than $R/2\pi L$ to make the inductive part of the impedance dominant. With known I and V (as complex numbers), one can extract Z from Z=V/I.

4. RLC Circuit

In yet another measurement method, the sensing coil is connected to a capacitor to create a RLC circuit. Measurement is performed around the resonance frequency, which should shift due to inductance change. Since the inductor and the resistor are in series, the capacitor may be connected in series or in parallel. The lumped input impedance for sinusoidal driving signal in each configuration is

| RL parallel to C | Serial RLC |
|---|---|
| $Z_{in} = \left(\frac{1}{R + j\omega L} + j\omega C\right)^{-1}$ | $Z_{in} = R + j\omega L + \frac{1}{j\omega C}$ |
| $= \frac{j\omega L + R}{1 - \left(\frac{\omega}{\omega_0}\right)^2 + j\omega RC}$ | $= R\left(1 + j\omega_0 \frac{L}{R}\left(\frac{\omega}{\omega_0} - \frac{\omega_0}{\omega}\right)\right)$ | where in both cases $$\omega_0^2 = \frac{1}{LC}.$$

Figure 7:
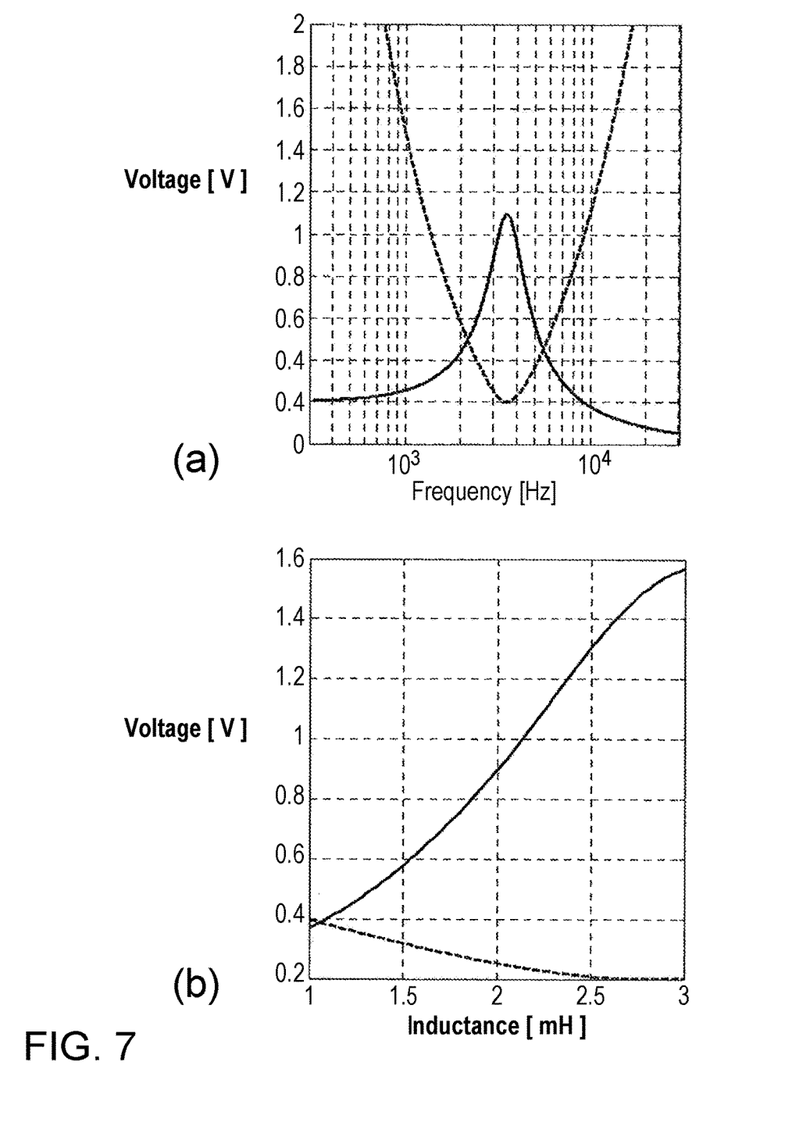
FIG. 7 shows in (a) simulation results for finding the electrical resonance frequency for parallel (solid line) and serial (dashed line) RLC circuits, and in (b) simulation results for voltage reading as function of inductance change for parallel (solid line) and serial (dashed line) RLC circuits.

Assume that the RLC circuit has a current source, and the voltage drop is measured over the circuit. FIG. 7 shows in (a) simulation results for finding the electrical resonance frequency for parallel (solid line) and serial (dashed line) RLC circuits, and in (b) simulation results for voltage reading as function of inductance change for parallel (solid line) and serial (dashed line) RLC circuits. The voltage levels in the figures are the expected levels for a 10 mA sinusoidal driving current. The voltage response is linear with the current. It can be seen that for low capacitance values (for example, in the figure C is on the order of 1 uF and less) both graphs exhibit local extremum points: a maximum for the parallel RLC circuit and a minimum for the serial RLC circuit. These extrema appear near the resonance frequency, $\omega_0$. Near the extremum points, the change in output signal as a function of inductance change is maximal and is thus the desired working point.

5. Coupled Coil Position Measurement Method

Figure 8:
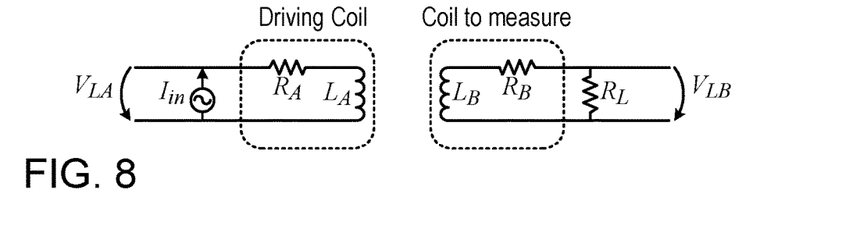
FIG. 8 shows a mutual inductance measurement circuit used in a coupled coil position sensing method disclosed herein.
Figure 9:
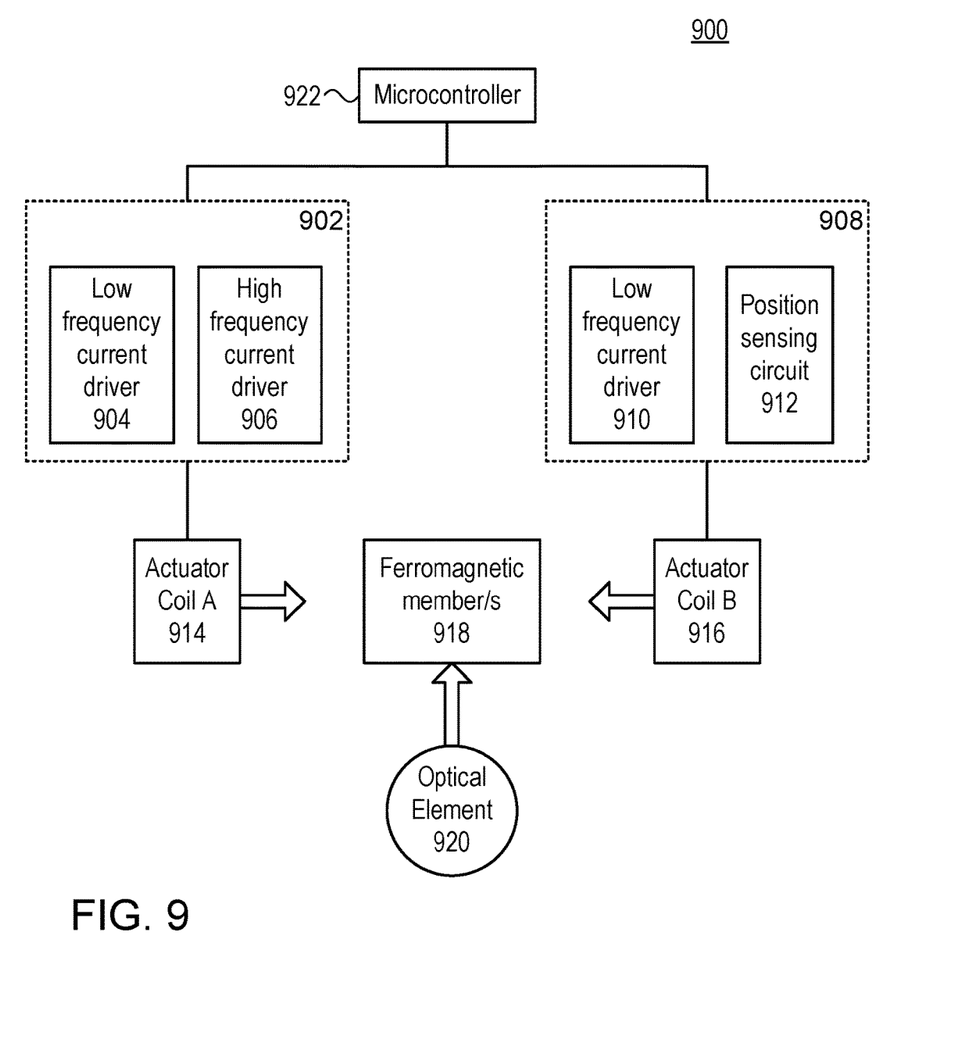
FIG. 9 shows schematically in a block diagram yet another embodiment of a camera subsystem for actuating an optical element in a digital camera and for sensing its position in a coupled coil configuration, as disclosed herein.

The mutual inductance of two coils may be used to sense the position of a moving ferromagnetic member and an optical element attached thereto, using the subsystem described in FIG. 8 and any of the "coupled coil" actuator embodiments described below. The term "coupled coil" is defined below. Assume two coils A and B wound in the same magnetic circuit and having a constant respective number of windings $N_A$, $N_B$ and resistances $R_A$, $R_B$, with exemplary values of $N_A = N_B = 200$-1000, $R_A = R_B = 5$-20Ω. In addition the two coils are defined with $L_A$, $L_B$ self-inductance, and M mutual inductance between the two coils. When the moving ferromagnetic part moves, the inductance value changes and is used to sense the position. In exemplary modules, the inductance values of the two inductors $L_A$, $L_B$ are equal at start and change simultaneously in the range of 1-10 mH during the actuation. The mutual inductance M changes in the range of M=0.1-5 mH. The two coils are connected in a circuit as shown in FIG. 9. Coil A is connected to an AC current driver with angular frequency $\omega$ (typically 500-10000 Hz), and coil B is connected in series with a load resistor $R_L$, which has a typical value of 100Ω or more.

The relation between the current in the coils and the voltage drop on them is given by:

$$\begin{pmatrix} V_{LA} \\ V_{LB} \end{pmatrix} = j\omega \begin{pmatrix} L_A & M \\ M & L_B \end{pmatrix} \begin{pmatrix} I_A \\ I_B \end{pmatrix} + \begin{pmatrix} R_A & R_B \end{pmatrix} \begin{pmatrix} I_A \\ I_B \end{pmatrix}$$

Since $I_A = I_{in}$ and $I_B = V_{LB}/R_L$ $$V_{LB} = j\omega M I_{in} + \frac{j\omega L_B}{R_L} V_{LB} + \frac{R_B}{R_L} V_{LB}$$

i.e.

$$V_{LB} = \frac{j\omega M}{1 - \frac{j\omega L_B + R_B}{R_L}} I_{in}$$

Since $R_L \gg R_B$, $\omega L_B$, we can approximate:

$$V_{LB} = j\omega M I_{in}$$

The output signal $V_{LB}$ is defined as the voltage drop on coil B in the AC frequency and is proportional to the mutual inductance M of the two coils, which in turn depends on the position of the actuator, as explained below. Note that the output signal is also proportional to the input frequency $\omega$, and hence the low frequency driving contribution of current drivers 904 and 910 (see FIG. 9, used for actuation) is practically cancelled out. Any addition of a low frequency current to the circuit will have little effect on the inductance measurement reading at the high frequency.

Coupled Coil Actuator Embodiments

FIG. 9 shows schematically in a block diagram another embodiment numbered 900 of a subsystem for actuating an optical element 920 in a digital camera and for sensing its position, as disclosed herein. Actuation and position sensing in subsystem 900 is essentially similar to that in subsystem 100. That is, a single magnetic circuit (actuator) is used to actuate and sense the position of the optical element. However, subsystem 900 differs from subsystem 100 in that it has two distinct electrical circuits, each connected to one of two coils in the same magnetic circuit. This is referred to henceforth as a "coupled coil" configuration. Both coils are used for driving (actuation). In addition, a high frequency signal is sent to one of the coils, while the high frequency is measured in the other coil for position measurement using a "mutual" inductance change (see description of inductance measurement method 5 above). Single actuators having two ferromagnetic members with respective cores and coils in a single magnetic circuit are described exemplarily in FIGS. 1A, 1B, 2, 3, 4, 6, 7 8, and 9 of PCT patent application PCT/IB2014/062836. Exemplarily in FIG. 1 therein, the two coils are numbered 106 and 112.

As shown in FIG. 9, subsystem 900 includes a first electrical circuit 902 with a first high current (for example 10-100 mA) low frequency (for example typically 0-100 Hz) current driver 904 and a low current (1-10 mA) high frequency (for example 10 times or more of the mechanical resonance frequency with typical value of 100 Hz) current driver 906, and a second electrical circuit 908 with a second high current (for example 10-100 mA) low frequency (for example typically 0-100 Hz) current driver 910 and an inductance-based position sensing circuit 912. First electrical circuit 902 is electrically connected to a first actuator coil 914 (also marked A). Second electrical circuit 908 is electrically connected to a second actuator coil 916 (also marked B). Both actuator coils 914 and 916 create a magnetic field in space, which actuates one or two moving ferromagnetic member(s) 918. Each moving ferromagnetic member is mechanically coupled to optical element 920. Subsystem 900 further includes a microcontroller 922 (which may be implemented in full or in part in a microcontroller of the camera) for controlling the actuation of the actuator, the electrical circuits and the associated current drivers and position measurement.

In use, as in subsystem 100, a strong (for example 10-100 mA) low frequency driving signal (for example up to the mechanical resonance frequency with typical value of 100 Hz) is used for actuation. Microcontroller 922 sends a current command to both high current low frequency current driver 904 and to high current low frequency current driver 910 simultaneously, in such way that the currents output of both DC current drivers is equal and it is driven to coils 914 and 916 simultaneously. As mentioned above, in addition to the strong and low frequency driving signal, a weak (for example 1-10 mA) high frequency position sensing signal (for example 10 times or more of the mechanical resonance frequency with typical value of 100 Hz) is used for the position sensing. The high frequency position sensing signal is injected only into first coil 914 from current driver 906 and is mixed with current sourced from current driver 910. Position sensing circuit 912 is used to measure the amplitude of the induced high frequency signal in second coil 916, and thus the mutual inductance ("M") of the two coils 914 and 916 (see inductance measurement method 5 below).

Figure 10A:
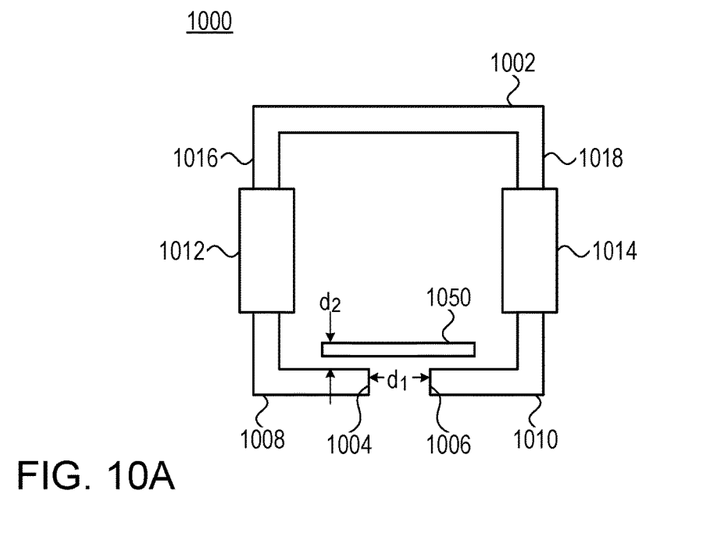
FIG. 10A shows an embodiment of an actuator in which a coupled coil position sensing method disclosed herein can be applied.

FIG. 10A shows another embodiment of an actuator with a single stationary ferromagnetic member having two coils and numbered 1000, in which a coupled coil position sensing method can be applied. Actuator 1000 is shown in a top (or bottom) view in the Z direction and includes a single stationary ferromagnetic member 1002. Member 1002 may have a partially closed rectangular or circular shape, having exemplarily a single opening with a large air gap $d_1$ between two edges 1004 and 1006 of, respectively, arm end members 1008 and 1010. Two coils 1012 and 1014 are wound on stationary ferromagnetic member 1002 such that each coil may cover for example one section ("arm") of the member (as shown, sections 1016 and 1018). Actuator 1000 further includes a moving ferromagnetic member 1020 that overlaps parts of, and is separated from sections of arm end members 1008 and 1010 by a small air gap $d_2$. During actuation, a magnetic circuit is formed by the stationary and moving ferromagnetic members, bridging the small air gaps. The actuation results in a movement of the moving ferromagnetic member (and optical element attached thereto) in the Z direction, i.e. substantially perpendicular to the X-Y plane. In the embodiment shown in FIG. 10A, the coils are arranged on opposite arms of the stationary ferromagnetic member, the coils being "parallel and opposite" to each other.

Figure 10B:
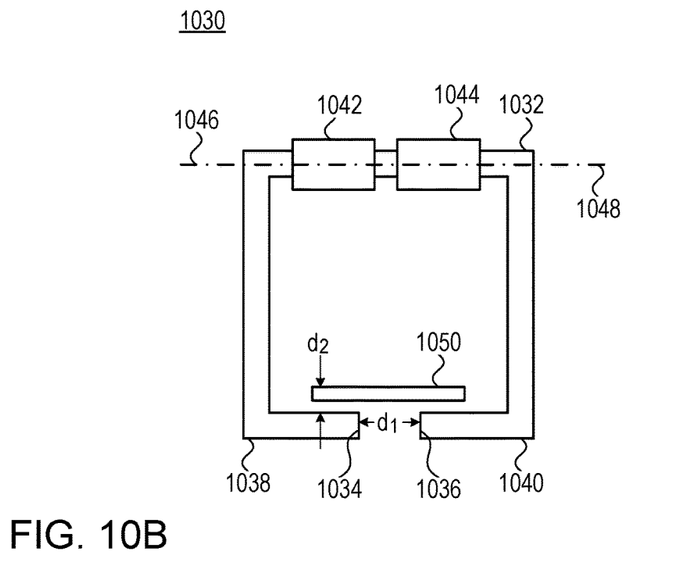
FIG. 10B shows another embodiment of an actuator in which a coupled coil position sensing method disclosed herein can be applied.

FIG. 10B shows yet another embodiment of an actuator numbered 1030, in which a coupled coil position sensing method disclosed herein can be applied. Actuator 1030 is similar to actuator 1000 in that includes a single stationary ferromagnetic member 1032. Stationary member 1032 may have a partially closed rectangular or circular shape, having exemplarily a single opening with a large air gap $d_1$ between two edges 1034 and 1036 of, respectively, arm end members 1038 and 1040. However, unlike in actuator 1000, two coils 1042 and 1044 are wound on stationary ferromagnetic member 1032 such that each coil is wound around a section (core) 1046 and aligned along a common long symmetry axis 1048. Thus, instead of being "parallel and opposite" as in actuator 1000, here the two coils are "parallel and coaxial". Actuator 1000 further includes a moving ferromagnetic member 1050 that overlaps parts of, and is separated from sections of arm end members 1038 and 1040 by a small air gap $d_2$. During actuation, a magnetic circuit is formed by the stationary and moving ferromagnetic members, bridging the small air gaps. The actuation results in a movement of the moving ferromagnetic member (and optical element attached thereto) in the Z direction, i.e. substantially perpendicular to the X-Y plane.

Figure 10C:
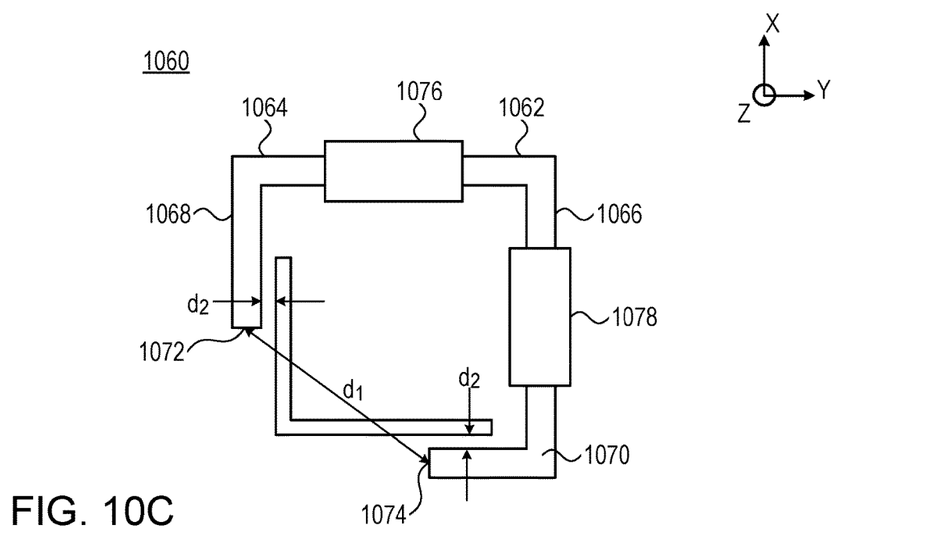
FIG. 10C shows another embodiment of an actuator in which a coupled coil position sensing method disclosed herein can be applied.

FIG. 10C shows yet another embodiment of an actuator numbered 1060, in which a coupled coil position sensing method disclosed herein can be applied. Similar to actuators 1000 and 1030, actuator 1060 includes a single stationary ferromagnetic member 1062, which, however, has a partially closed rectangular shape and includes two elongated ferromagnetic cores 1064 and 1066 that form a 90 degree angle at one end of each core. Each core has at another end an L-shaped section with a respective end member (respectively 1068 and 1070). End members 1068 and 1070 are separated at respective edges 1072 and 1074 by a large air gap $d_1$. Two coils 1076 and 1078 are wound on, respectively, cores 1064 and 1066. Actuator 1060 further includes a moving ferromagnetic member 1080 that overlaps parts of, and is separated from end members 1068 and 1070 by a small air gap $d_2$. During actuation, a magnetic circuit is formed by the stationary and moving ferromagnetic members, bridging the small air gaps. The actuation results in a movement of the moving ferromagnetic member (and optical element attached thereto) in the Z direction, i.e. substantially perpendicular to the X-Y plane.

While FIGS. 10A-C show actuator embodiments show stationary ferromagnetic members having general rectangular shapes and straight moving ferromagnetic members, other "coupled coil" actuator may be possible. For example, the stationary ferromagnetic member may have (as mentioned) a round shape and the moving ferromagnetic member may have a rounded shape so as to keep a constant small gap from sections of the stationary member. In actuators with rounded members, the two coils will be positioned on the same radius of curvature of the stationary ferromagnetic members.

Inductance to Position Translation

Figure 11:
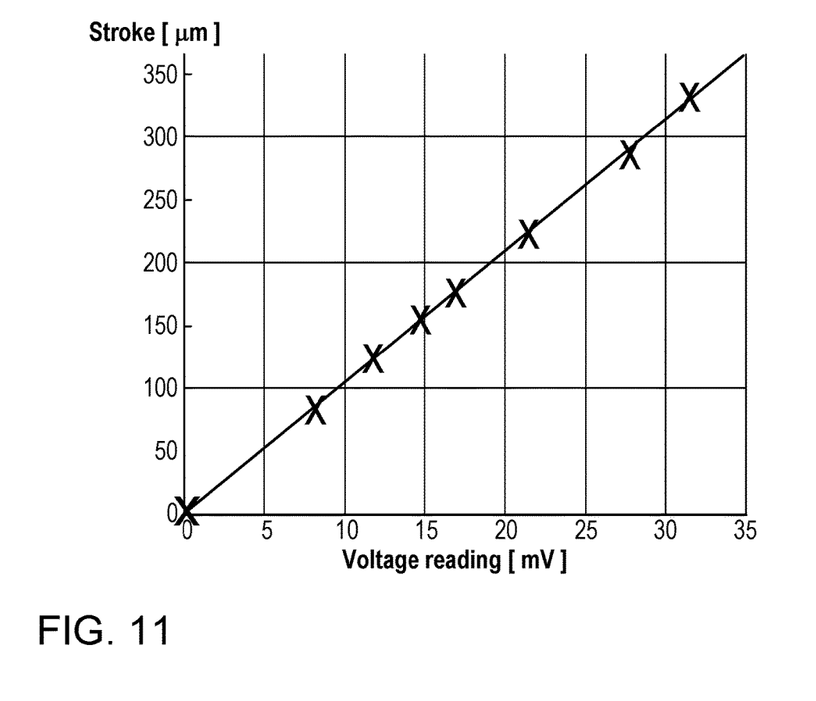
FIG. 11 shows experimental results of position vs. voltage using the subsystem of FIG. 2A and the voltages reading method described in FIG. 6A.

The relation between inductance and position can be found by looking at the relation:

$$L = N^2/(\mathcal{R}_{Metal} + \mathcal{R}_{Air})$$

where L is the coil inductance, N is the number of coil windings, $\mathcal{R}_{Metal}$ is the magnetic reluctance of the metal and $\mathcal{R}_{Air}$ is the magnetic reluctance of the air. $\mathcal{R}_{Air}$ depends on the geometry of the air gap. The reluctance decreases and the inductance increases as the air gap decreases. The exact relation between $\mathcal{R}_{Air}$ and the moving ferromagnetic member position depends on the geometry and cannot be calculated analytically in the general case. FIG. 11 shows experimental results of position vs. voltage readings using the subsystem of FIG. 2A and a Maxwell bridge with inductor measurement. Similar experimental results may be obtained for any of the other inductance based position measurement methods described above.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

All patents, patent applications and publications mentioned in this specification are herein incorporated in their entirety by reference into the specification, to the same extent as if each individual patent, patent application or publication was specifically and individually indicated to be incorporated herein by reference. In addition, citation or identification of any reference in this application shall not be construed as an admission that such reference is available as prior art to the present application.

What is claimed is:

1. A method for sensing the position of an optical element in a digital camera, comprising:
   a) providing a first electro-magnetic (EM) actuator that includes a first stationary ferromagnetic member having a first ferromagnetic core surrounded at least partially by a first coil, the first stationary member being part of a first magnetic circuit that includes a first large air gap;
   b) providing a second EM actuator having a second stationary ferromagnetic member with a respective second ferromagnetic core surrounded at least partially by a second coil, the second stationary member being part of a second magnetic circuit that includes a second large air gap,
   c) actuating the first EM actuator to move the optical element in a first direction, wherein the actuation causes a moving ferromagnetic member coupled mechanically to the optical element to by-pass or bridge the first large air gap through at least one air gap smaller than the chosen large air gap,
   d) actuating the second EM actuator to move the optical element in a second direction opposite to the first direction;
   a) measuring an inductance value using the second EM actuator; and
   b) correlating the measured inductance related value with a position of the optical element.

2. The method of claim 1, wherein the step of actuating includes supplying a strong low frequency signal to the first coil and wherein the step of measuring an inductance value includes measuring an inductance using a response to a weak high frequency signal or using a response to a current pulse supplied to the first coil.

3. The method of claim 1, wherein the first ferromagnetic core is further surrounded at least partially by a second coil and wherein the step of measuring an inductance value includes measuring an inductance using a response to a weak high frequency signal or using a response to a current pulse supplied to both coils.

4. The method of claim 1, wherein the first actuator further includes a second ferromagnetic core surrounded at least partially by a second coil, the second ferromagnetic member being part of the first magnetic circuit that includes the first large air gap, and wherein the step of measuring an inductance value includes measuring an inductance using a response to a weak high frequency signal or using a response to a current pulse supplied to both coils.

5. The method of claim 1, wherein the first ferromagnetic core is further surrounded at least partially by a second coil, wherein the inductance value is a mutual inductance value, wherein the step of actuating includes supplying a respective strong low frequency signal to each coil, and wherein the step of measuring an inductance value includes supplying a weak high frequency signal or a current pulse to one coil and measuring a response to the weak high frequency signal or to the current pulse in the other coil.

6. The method of claim 1, wherein the first actuator further includes a second ferromagnetic core surrounded at least partially by a second coil, wherein the inductance value is a mutual inductance value, wherein the step of actuating includes supplying a respective strong low frequency signal to each coil, and wherein the step of measuring an inductance value includes supplying a weak high frequency signal or a current pulse to one coil and measuring a response to the weak high frequency signal or to the current pulse in the other coil.

7. Apparatus for sensing the position of an optical element in a digital camera, comprising:
   a) a first electro-magnetic (EM) actuator that includes a first stationary ferromagnetic member with a first ferromagnetic core surrounded at least partially by a first coil, the first stationary member being part of a first magnetic circuit that includes a first large air gap, the first EM actuator configured to move the optical element in a first direction when actuated, the actuation causing a first moving ferromagnetic member mechanically coupled to the optical element to by-pass or bridge the first large air gap through at least one smaller air gap;
   b) a second EM actuator having a second stationary ferromagnetic member with a ferromagnetic core surrounded at least partially by a second coil, the second stationary member being part of a second magnetic circuit that includes a second large air gap, and c) a position sensing module configured, to drive the actuation of one actuator and to measure an inductance value correlated with a given position of the optical element in the other actuator.

8. The apparatus of claim 7, wherein the position sensing module includes:
   i. a driving circuit with a current driver operative to provide a low frequency high current signal and a signal selected from the group consisting of a high frequency low current signal and a pulse current signal, and
   ii. a position sensing circuit operative to measure the inductance value.

9. The apparatus of claim 8, wherein the first ferromagnetic core is further surrounded at least partially by a second coil and wherein the driving circuit and the position sensing circuit are coupled electrically to both coils.

10. The apparatus of claim 9, wherein the inductance value is a mutual inductance value, wherein the driving circuit is configured to provide the low frequency high current signal to both coils and to provide the high frequency low current signal or the pulse current signal to one coil, and wherein the position sensing circuit is configured to measure the mutual inductance value based on a response to the high frequency low current signal or the pulse current signal obtained in the other coil.

11. The apparatus of claim 8, wherein the first actuator further includes a second elongated ferromagnetic core surrounded at least partially by a second coil, the second ferromagnetic member being part of the first magnetic circuit that includes the first large air gap, and wherein the driving circuit and the position sensing circuit are coupled electrically to both coils.

12. The apparatus of claim 11, wherein the driving circuit is configured to provide to both coils the low frequency high current signal and either the high frequency low current signal or the pulse current signal.

13. The apparatus of claim 11, wherein the inductance value is a mutual inductance value, wherein the driving circuit is configured to provide the low frequency high current signal to both coils and to provide the high frequency low current signal or the pulse current signal to one coil, and wherein the position sensing circuit is configured to measure the mutual inductance value based on a response to either the high frequency low current signal or to the pulse current signal, the response obtained in the other coil.

* * * * *

UNITED STATES PATENT AND TRADEMARK OFFICE
CERTIFICATE OF CORRECTION

PATENT NO.         : 9,897,432 B2
APPLICATION NO.    : 15/028426
DATED              : February 20, 2018
INVENTOR(S)        : Gil Bachar, Ephraim Goldenberg and Gal Shabtay Page 1 of 1

It is certified that error appears in the above-identified patent and that said Letters Patent is hereby corrected as shown below:

In the Claims

Delete Claim 1, from Column 13, Line 51 to Column 14, Line 10 and insert the following:

--1. A method for sensing the position of an optical element in a digital camera, comprising:
a) providing a first electro-magnetic (EM) actuator that includes a first stationary ferromagnetic member having a first ferromagnetic core surrounded at least partially by a first coil, the first stationary member being part of a first magnetic circuit that includes a first large air gap;
b) providing a second EM actuator having a second stationary ferromagnetic member with a respective second ferromagnetic core surrounded at least partially by a second coil, the second stationary member being part of a second magnetic circuit that includes a second large air gap,
c) actuating the first EM actuator to move the optical element in a first direction, wherein the actuation causes a moving ferromagnetic member coupled mechanically to the optical element to by-pass or bridge the first large air gap through at least one air gap smaller than the chosen large air gap;
d) actuating the second EM actuator to move the optical element in a second direction opposite to the first direction;
e) measuring an inductance value using the second EM actuator; and
f) correlating the measured inductance related value with a position of the optical element.--

Signed and Sealed this
Third Day of April, 2018

Andrei Iancu
*Director of the United States Patent and Trademark Office*